US005436691A

United States Patent [19]

Rees et al.

[11] Patent Number: 5,436,691

[45] Date of Patent: Jul. 25, 1995

[54] COPIER WITH ANAMORPHIC MAGNIFICATION IMAGING SYSTEM

[75] Inventors: James D. Rees, Pittsford; Conrad J. Bell, Webster, both of N.Y.

[73] Assignee: Xerox Corporation, Stamford, Conn.

[21] Appl. No.: 238,774

[22] Filed: May 5, 1994

[51] Int. Cl.⁶ ............ G03B 27/68

[52] U.S. Cl. ............ 355/52; 355/238

[58] Field of Search ............ 355/1, 52, 238

[56] References Cited

U.S. PATENT DOCUMENTS

| | | | |
|---|---|---|---|
| 3,917,393 | 11/1975 | Nier | 355/49 |
| 4,394,083 | 7/1983 | Rees | 355/1 |
| 4,595,275 | 6/1986 | Sonobe | 355/8 |
| 4,719,492 | 1/1988 | Hyodo | 355/52 |
| 4,897,688 | 1/1990 | Smith et al. | 355/52 |
| 4,982,222 | 1/1991 | Rees | 355/1 |

OTHER PUBLICATIONS

William Lama, "Optical Properties of GRIN fiber lens arrays: dependence on fiber length," *Applied Optics*, vol. 21, No. 15, Aug. 1, 1982.

James D. Rees, "Office applications of gradient-index optics," SPIE vol. 935 Gradient-Index Optics and Miniature Optics (1988).

James D. Rees, "Method to Lengthen the Total Conjugate of Fast Gradient Index Arrays," Xerox Disclosure Journal, vol. 12, No. 3, May/Jun. 1987.

*Primary Examiner*—Michael L. Gellner
*Assistant Examiner*—D. P. Malley

[57] ABSTRACT

A copier with an anamorphic magnification imaging system is provided with improvements which enable increased resolution of exposed line images at a photoreceptor. The improvement relates to reducing the effective imaging aperture through which the images is projected onto the surface of a photoreceptor. In one embodiment, a gradient index lens array which transmits light reflected from illuminated scan strip on a document platen is provided with two blockers attached to opposite sides of the lens array. Each blocker element has a blocking end which projects into the optical path and blocks a portion of the light that would otherwise be transmitted along the optical path. The effect of the two blockers is to form an effective imaging aperture having a width less than 1mm, in the preferred embodiment about 0.4mm. This narrow imaging width enables a high resolution output image. Increased illumination requirements are met, in another embodiment, by using a faster lens to increase exposure and modifying the lens by adding an extra pitch to increase the total conjugate which would otherwise limited by using the faster lens.

9 Claims, 4 Drawing Sheets

COPIER WITH ANAMORPHIC MAGNIFICATION IMAGING SYSTEM

BACKGROUND AND MATERIAL DISCLOSURE STATEMENT

The present invention relates to a multi-magnification copier and more particularly to a copier which includes an imaging system which anamorphically produces reduced or enlarged copies of an original document It is well known in the prior art to produce reduced or enlarged copies of original documents by an anamorphic process, e.g. by introducing a velocity mismatch between a document scanning optics in a photoreceptor moving in a process direction upon which the latent image is formed. For anamorphic reduction, the scanning is accomplished at a faster rate than a photoreceptor motion resulting in the image being compressed in the process direction. For anamorphic enlargement, the scanning is accomplished at a slower rate than the photoreceptor motion, thereby elongating the image in the process direction. U.S. Pat. No. 4,897,688 (Smith et. al.) discloses an extensive review of prior art anamorphic techniques and the contents of this patent is hereby incorporated by reference. The Smith et. al. patent usefully summarizes the critical problems which must resolved in a practical anamorphic magnification copying system. The anamorphic magnification creates a distortion of the image which necessitates a very narrow imaging slit at the photoreceptor surface. A narrow slit width in turn requires increased exposure of the document being scanned. The Smith et. al. patent provided an enablement of an anamorphic machine by forming a narrow effective slit width by using a gradient index lens in combination with a field stop attached to the side of the lens, the field stop defining a narrow slit. Document illumination was óptimized by introducing a cylindrical reflector on the opposite side of the illuminated scan strip area to concentrate light from the scan illumination source. While this design results in an effective slit width of about one millimeter, resolution goals have further increased, for example, at least 2.5 lines per millimeter are current requirements for high quality output copies. To reach this higher resolution, it has been found that an even narrower imaging slit than that possible with the prior art is required. Another problem with the Smith et. al. design is that slit aperture near the photoreceptor attracts dirt and toner builds which bridge the aperture and tend to obscure part of the final image.

The present invention is, therefore, directed to an anamorphic imaging system which forms images on a photoreceptor surface through an imaging slit having a less than one millimeter width while maintaining illumination exposure levels. In one embodiment, the narrow effective slit width is enabled by attaching blockers to the sides of a gradient index lens array which transmits the image from the object to the image plane. The blockers cooperate to provide an effective narrow slit of <1 mm between them. This embodiment also substantially reduces the direct and toner contamination by removing the mechanical aperture from the vicinity of the photoreceptor. In another embodiment, a narrower slit width is accomplished by preparing a photographic image of a narrow (<1 mm) slit and placing the film on or beneath the object plane. Illumination exposure is maintained in a still further embodiment by using a faster lens array and compensating for reduction in total conjugate by adding an extra pitch to the lens array. Relevant publications for this embodiment are an article in Applied Optics, Vol. 21, No. 15, Aug. 1, 1982 entitled "Optical properties of GRIN fiber lens arrays: dependence on fiber length" by William Lama, an article in SPIE Vol. 935 Gradient-Index Optics and Miniature Optics (1988) entitled "Office applications of gradient-index optics" by James D. Rees and a disclosure in the Xerox Disclosure Journal, Vol. 12, No. 3, May/June 1987, entitled "Method to Lengthen the Total Conjugate of Fast Gradient Index Arrays" by James D. Rees. All of these publications are hereby incorporated by reference.

More particularly, the present invention relates to an improved copier for producing anamorphically reduced or enlarged images of a document moved across a surface of a document platen at a scanning speed, the combination of: an illumination means for providing a narrow band of illumination along a scanning strip of the bottom surface of the platen, means for moving an original document at a scanning speed across the top surface of the platen so that the document is scanned by incremental illumination along said scan strip, linear lens means positioned along an optical path extending between said platen and a photoreceptor moving at said process speed, said linear lens means projecting light reflected from said document during said incremental scanning, and means for changing the scanning speed relative to the process speed, the improvement wherein the light transmitted through said lens means onto the photoreceptor surface passes through an effective slit width less than 1 mm.

DESCRIPTION OF THE INVENTION

Figure 1:
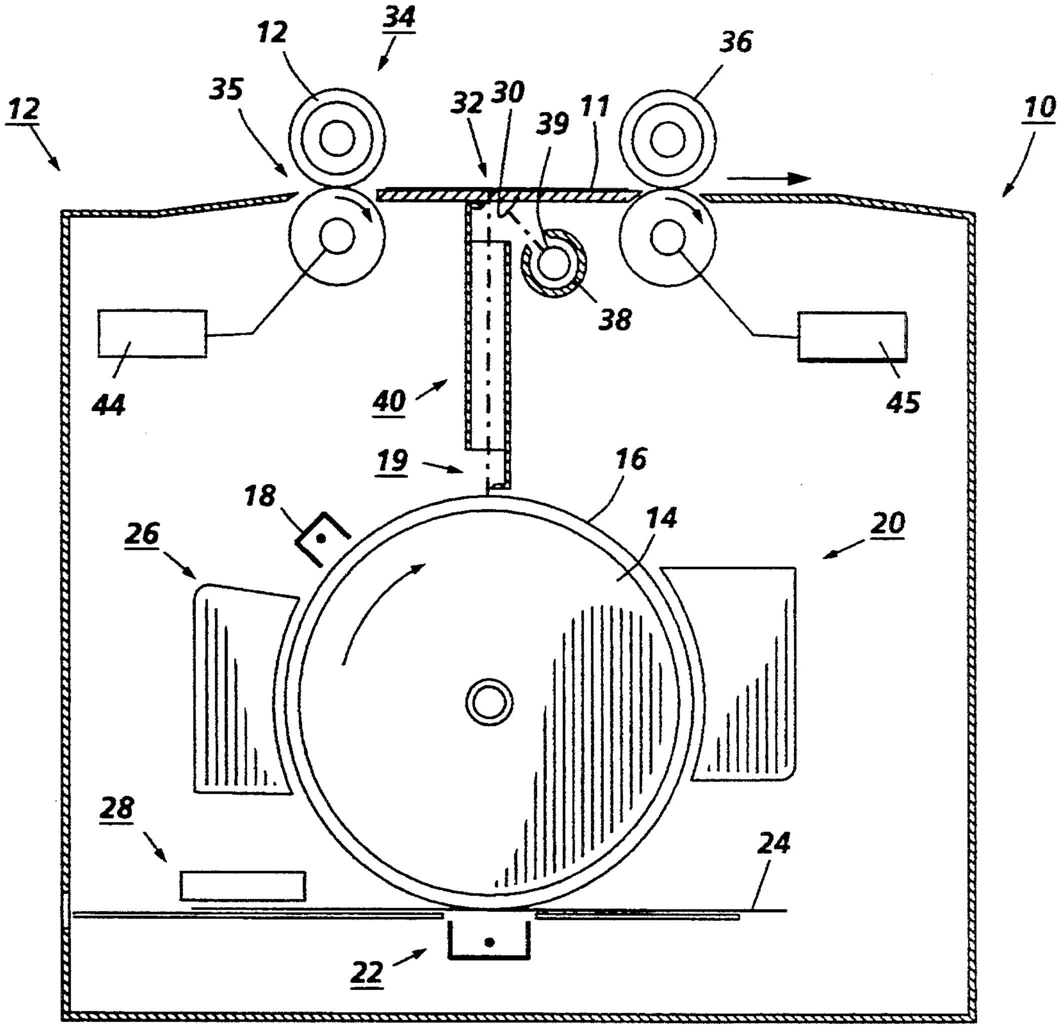
FIG. 1 shows a schematic view of a copier incorporating the anamorphic magnification imaging system of the present invention.

Referring to FIG. 1 of the drawings, there is shown a copier 10 incorporating an anamorphic imaging system of the present invention. Machine 10 is particularly adapted to copy document having long widths such as blueprints and the like, but the invention is not necessarily limited to this usage. Machine 10 has a suitable frame within which the xerographic components and stations are operatively supported. Briefly, and as will be familiar to those skilled in the art, the machine xerographic components include a recording member, shown here in the form of a rotatable drum photoreceptor 14 having a photoconductive surface 16. Other photoreceptor types such as belt, web, etc. may be used instead. Operatively disposed about the periphery of drum 14 are charge station 18, for placing a uniform charge on the photoconductive surface; exposure station 19 where the previously charged surface 16 is exposed to image rays of a document 11 being copied or reproduced; development station 20 where the latent electrostatic image created on the photoconductive surface 16 is developed by toner; transfer station 22 for transferring the developed image to a suitable copy substrate material such as a copy sheet 24 brought forward in timed relation with the developed image on surface 16, and cleaning station 26 for removing leftover developer from surface 16 and neutralizing residual charges thereon. Following transfer, sheet 24 is carried forward to a fusing station 28 where the toner image is fixed. These xerographic processing stations, and the steps incident to operation thereof, are well known in the prior art.

Referring still to FIG. 1, a transparent platen 30 supports a document which is fed from the left hand side of the Figure (front of machine) and is moved past a scan strip 32 by a constant velocity type transport 34. As will be understood, scan strip 32 is, in effect, a narrow width, illuminated scan line extending across the width of platen 30 (into the page) at a desired point along the platen where the document is scanned line by line as the document is moved along the platen surface by transport 34. Transport 34 has two sets of input and output feed roll pairs 35, 36, respectively, on each side of scan strip 32 for moving a document across platen 30 at a predetermined speed. Exposure lamp 38 is provided to illuminate scan strip 32. The reflected image rays from the scanned document line are projected and focused by a gradient index fiber lens array 40 having sufficient length to expose the photoconductive surface 16 of the moving drum 14 at exposure station 19.

Drive rollers 35, 36 are driven by DC stepper motors 44, 45 respectively. These motors are driven at variable pulse rates derived from operator selection at the control panel (not shown) 46. When operation in a normal 1X reproduction rate is selected, the stepper motor drives the drive roller at a rate which moves the document across the platen at the same speed as the photoreceptor rotation. When a reduction mode is selected, the drive rollers are driven at a value faster than the photoreceptor rotation, the value given by the expression $m=V_{pr}\div V_{doc}$ where m is the magnification, $V_{pr}$ is the photoreceptor speed and vdoc is the drive roller (cvt speed). The latent image formed at the photoreceptor is thus anamorphically reduced (length of the image in the direction of travel is reduced). Selection of an enlargement magnification value will result in the driver roller moving the document at a slower rate than the photoreceptor speed thereby lengthens (elongating) the image in the direction of travel.

As previously mentioned, the key to obtaining anamorphically reduced enlarged images with acceptable resolution is to project the document image through a very narrow slit width while maintaining adequate illumination for proper exposure.

Figure 2:
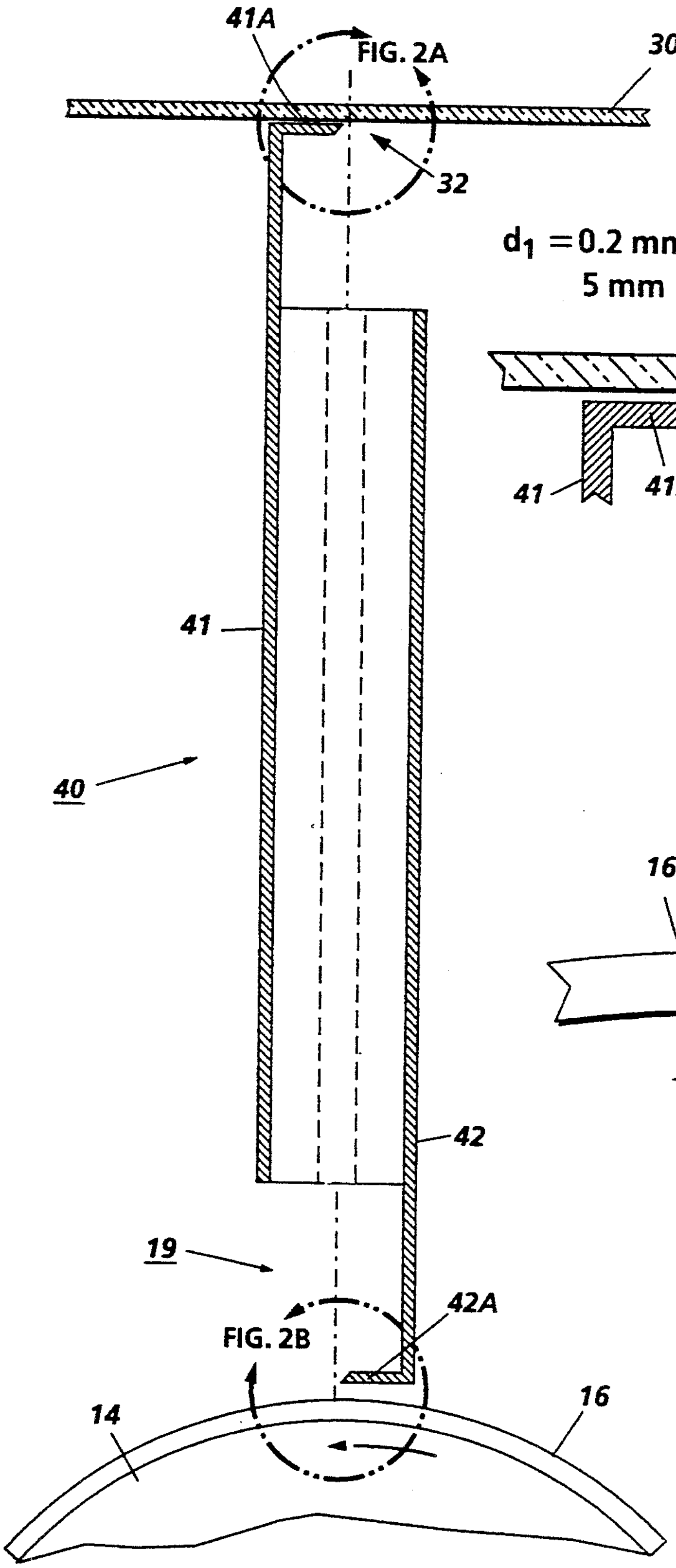
FIG. 2 is an enlarged view of the imaging lens assembly shown in FIG. 1.
Figure 2A:
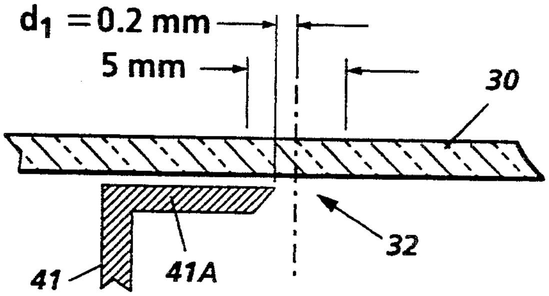
FIG. 2A and 2B are enlarged views of the lens array blockers (field stops) which cooperate to form a narrow imaging slit.
Figure 2B:
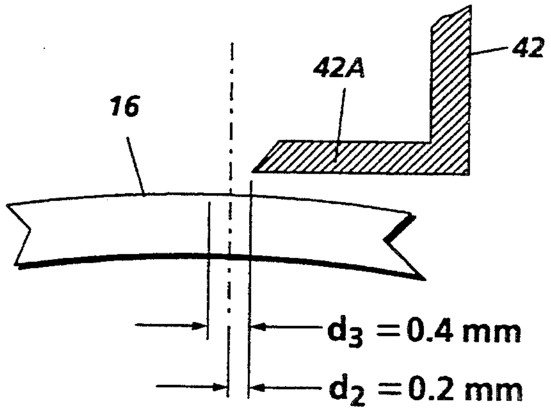

Referring now to FIG. 2, 2A and 2B, an enlarged view of lens array assembly 40 with blockers 41,42 is show. Blocker 41 is attached to the side of array 40 and extends upward and terminates at a right angle 41A which extends into the page and is in virtual contact with the underside of platen 30. End 41A terminates a distance d1 (0.2 mm) from the centerline of array 40 and the center of the scan strip 32. The light reflected from the object plane of the platen is thus reduced from the nominal 5 millimeter width to about ½ plus 0.2 mm or 2.7 mm. Blocker 42 is attached to the other side of array 40 and terminates at a right angle 42A also projecting into the optical path. Angle 42A terminates a distance d2 from the centerline of array 40. Blocker 41 and 42 in combination act as a mechanical stop to form an effective slit width $d_3$ of 0.2 mm plus 0.2 mm for a total of 0.4 mm. Since the blocker functions are separated, unlike the slit in the Smith et. al. patent, this embodiment is not subject to the problem of dirt or toner buildup across the slit. To further reduce contamination, the blockers can be made of a metallic material and grounded. In order to provided adequate exposure, lamp 38 (FIG. 1) is a linear fluorescent which includes an aperture 39 preferentially directing output radiation to scan slit 32. Current may be increased to lamp 38 upon selection of a magnification mode. In a preferred embodiment, the lens array 40 is a fast lens such as an SLA 12. While this faster lens provides a greater level of exposure, it also includes a total conjugate which may be too short for some systems. Therefore, as described below, a method is provided to increase the total conjugate of an SLA 12 lens.

Figure 3:
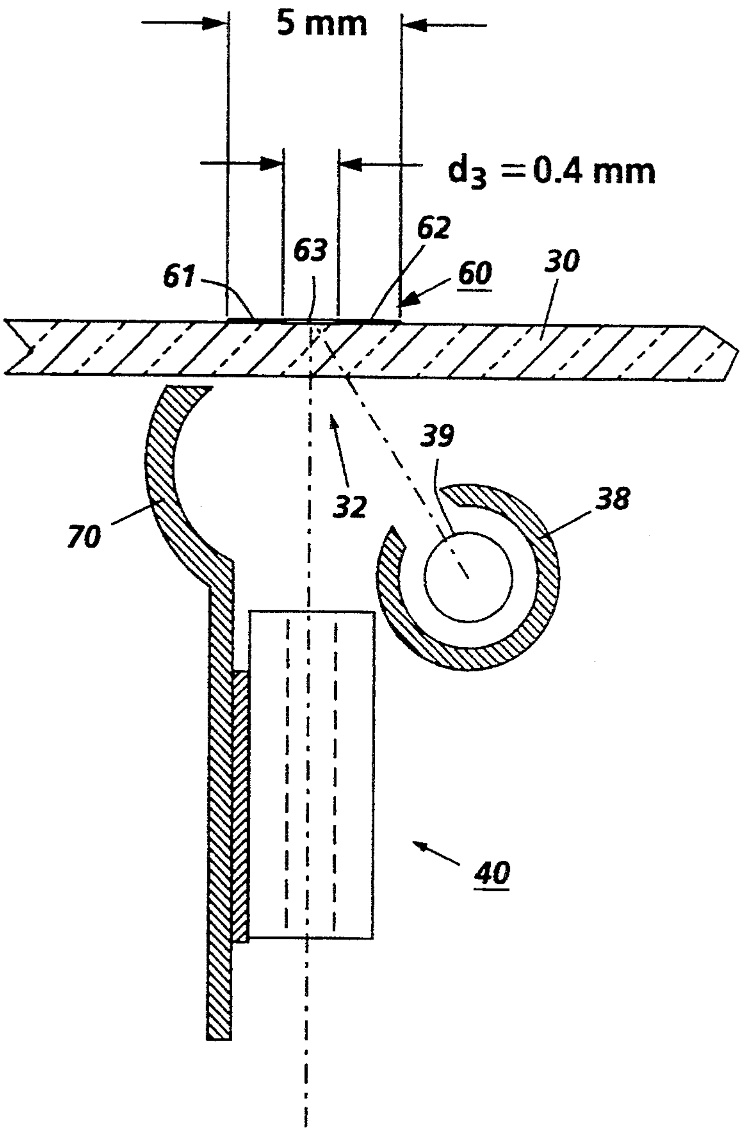
FIG. 3 is an alternate embodiment of a photographically formed slit attached to the platen.

According to a second embodiment of the invention, an effective slit width of less than 1 mm can be achieved by forming a narrow slit photographically on a film and attaching the film to the platen, centering the slit in the center of scan strip area 32. Referring to FIG. 3, a portion of platen 30 has been enlarged. A film strip 60 is attached to the top of the platen centered in scan strip area 32. Strip 60 is thin enough not to impede the travel of document 11. Strip 60 has been formed photographically to have two opaque masking portions 61, 62, and a transparent center portion (slit) 63. Slit 63 is formed to have the desired width. While shown on the top of the platen, strip 60 can also be placed on the bottom surface of the platen or embedded in the platen. In other words there are various locations in the object plane in which the film strip 60 can be placed. This embodiment has the same advantage of the dual blocker element of avoiding dirt and toner contamination problems. Further, this embodiment also allows for incorporation of a curved reflector 70 to increase efficiency of the illumination of the scan strip. While a film is a preferred embodiment, other materials are possible such as forming slit in a thin metal slit.

In the embodiment described above, lens array 40 was an SLA 12 lens. This lens, while having enhanced exposure, has total conjugate of 32 to 44 mm which may be short for some imaging system requirements. According to another aspect of the invention, the SLA 12 lens can be modified to have a longer total conjugate while maintaining the exposure increase associated with the higher SLA numbers. This is accomplished by adding an extra pitch to the lens equal to $2n/\sqrt{A}$. For purposes of illustration, it is assumed that in a given imaging system, an SLA 6 lens is being used as lens array 40. Column 2, of table 1 shows the characteristics of an SLA 6 lens which includes a total conjugate (TC) of 67 mm. If it is desired to retain this total conjugate and yet take advantage of the this increase in illumination level ($H_{max}$) is 3.2 times greater. This increase in increased exposure available with the faster SLA 12 lens, an SLA 12 lens modified to increase the total conjugate to 67 mm is required. As shown, illumination of the modified SLA lens can be understood by considering the following analysis of the lens characteristics. The total conjugate of a Selfoc lens array is:

$$TC=[2\tan(\sqrt{A}L/2)/n_o\sqrt{A}]+L$$

where L is the fiber length, $n_o$ is the axial refractive index, and $\sqrt{A}$ is the fiber gradient constant.

Figure 4:
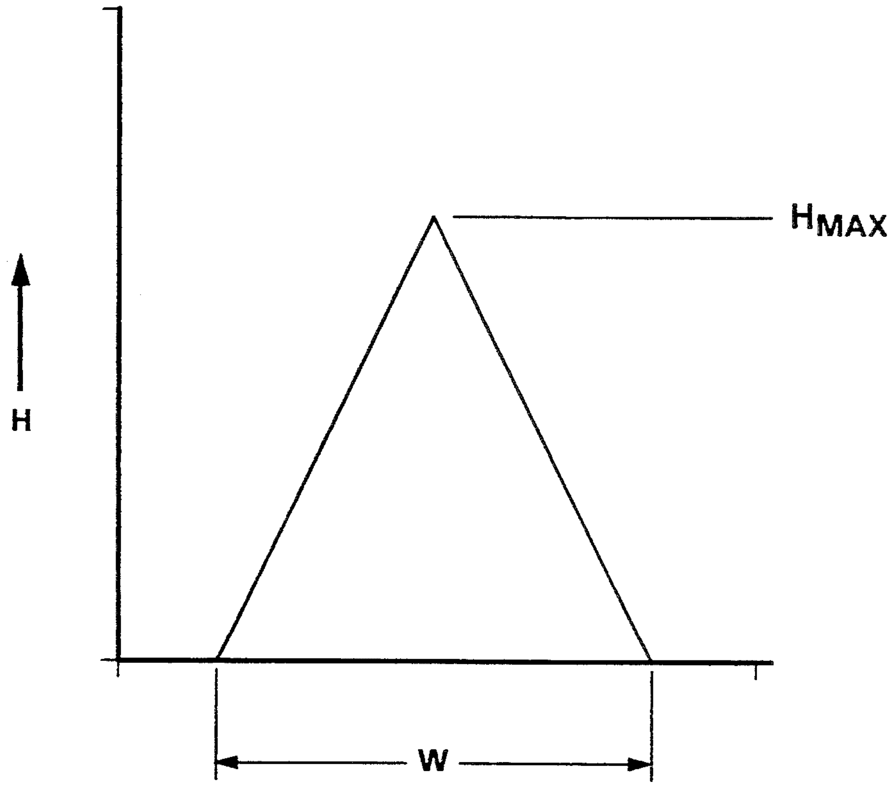
FIG. 4 is an irradiance profile at the image plane.

The irradiance profile at the image plane (the photoreceptor) for a typical two-row lens array is shown in FIG. 4. The profile is triangular with a peak irradiance $H_{max}$ equal to:

$$H_{max}=[\ {}^{2}NTn_o^{2}AR^{2}/2ab][1-(3b^{2}/4a^{2})]$$

where N is the document radiance, T is the fiber transmittance =0.9 b is a fiber packing factor =1.03, (a) =sec ($\sqrt{A}L/2$) and R is the radius of the fibers. The profile has a base width:

$$W=2R\ sec(\sqrt{A}L/2)+\sqrt{3}bR$$

Figure 5:
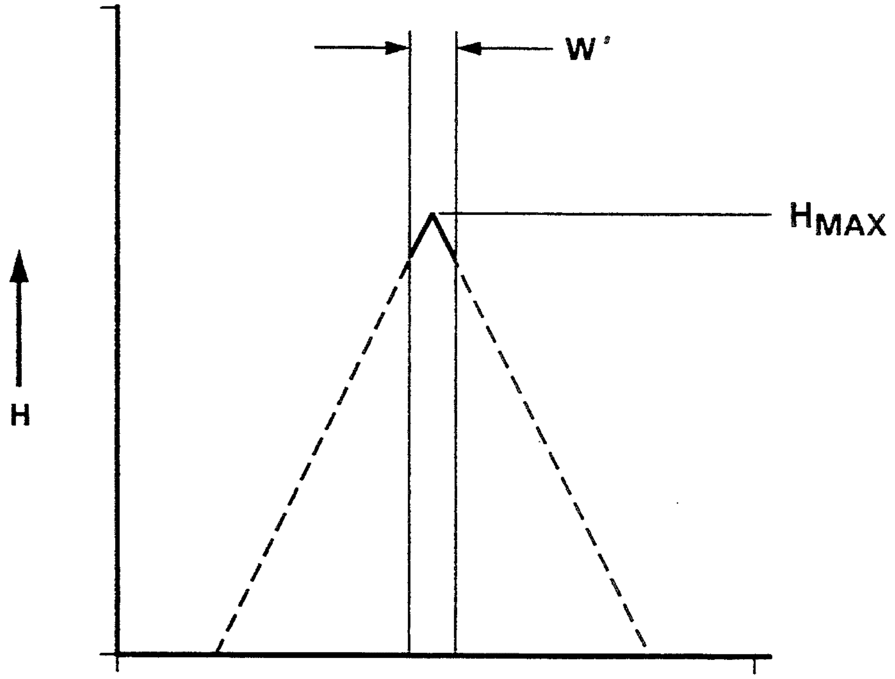
FIG. 5 is a profile of FIG. 4 truncated by a narrow slit.

FIG. 5 shows the above irradiance profile truncated by a narrow slit W'. For small values of W' the exposure of the photoreceptor is:

$$E\approx H_{max}W'/v$$

where v is the velocity of the photoreceptor. The irradiance profile is best understood by a reference to the Applied Optics article by William Lama referenced supra.

Rays travel inside a Selfoc fiber in a sinusoidal path due to he gradient index of refraction. The period of this path is:

$$P=2\ \ /\sqrt{A}=27.0\ mm\ for\ a\ SLA\ 12A\ lens\ array.$$

TABLE 1

| lens type | SLA 6 | SLA 12 |
|---|---|---|
| T | 0.9 | 0.9 |
| $n_o$ | 1.543 | 1.620 |
| $\sqrt{A}$ | 0.1269 mm − 1 | 0.2327 |
| R | 0.535 mm | 0.5425 |
| b | 1.03 | 1.03 |
| L | 28.88 mm | 42.32 |
| TC | 67.0 mm | 67.0 |
| a | 3.87 | 4.76 |
| W | 5.1 mm | 6.1 |
| $H_{max}$ | 0.0116 N | 0.0366 N |
| $H_{max}$ (relative) | 1.0 | 3.2 |

Referring to Table 1, the second column shows the SLA 6 data with a relative peak irradiance of 1.0.

The third column shows the results when an extra pitch of SLA 12 graident-index glass (27.0 mm from equation (4))is added to the standard fiber length. The peak irradiance is increased by a factor of 3.2× over twice the value of the approach of column 1.

If necessary, even higher peak irradiance is possible with a 67 mm TC by adding two gradient-index glass pitches to an SLA 15 lens arra $H_{max}$ is increased by a factor of 4.4× over an SLA 6 array. This array has the disadvantage of a very short working distance of about 5 mm.

While the embodiment disclosed herein is preferred, it will be appreciated from this teaching that various alternative, modifications, variations or improvements therein may be made by those skilled in the art, which are intended to be encompassed by the following claims:

We claim:

1. An improved copier for producing anamorphically reduced or enlarged images of a document moved across a surface of a document platen at a scanning speed, the combination of:

an illumination means for providing a narrow band of illumination along an illuminated scan strip at the bottom surface of the document, means for moving an original document at a scanning speed across the top surface of the platen so that the document is scanned by incremental illumination along said scan strip, linear lens means positioned along an optical path extending between a platen and a photoreceptor moving at said process speed, said linear lens means projecting light reflected from said document during said incremental illumination scanning, and means for changing the scanning speed relative to the process speed, the improvement wherein the light transmitted through said lens means onto the photoreceptor surface passes through an effective slit width approximately 0.5 mm.

2. The copier of claim 1 wherein the linear lens means is an assembly comprising a gradient index lens array with a first blocker element attached to a first side of the array and having an end portion projecting upward and in virtual contact with the platen and extending into the optical path to block light from illuminating a portion of the scanning strip, together with a second blocker attached to an opposite side of the lens and having an end projecting towards, and in close proximity to, said photoreceptor into said optical path to block a portion of the light transmitted through the array whereby the light reaching the photoreceptor surface passes through an effective slit width created by the two blocker ends.

3. The copier of claim 2 wherein said effective slit width is approximately 0.4 mm.

4. The copier of claim 3 wherein the mask is photographically formed and is positioned on the top of the platen.

5. The copier of claim 3 where the mask is positioned in the object plane.

6. The copier of claim 1 wherein the linear lens means is a gradient lens array comprising a plurality of gradient index optical fibers having an initial length L and wherein said length L is increased by the incorporation of an extra pitch of gradient index glass to said array equal to 2n/$\sqrt{}$ A where the $\sqrt{}$ A is fiber gradient constant.

7. An optical imaging system for transmitting reflected line images from a scan strip on a platen along an optical path extending through a linear lens array and to the surface of a photosensitive imaging medium, the improvement wherein the lens array has first and second blockers positioned in close proximity to the object and image planes respectively, said blockers blocking a portion of said reflected light so that reflected line images are projected through an aperture having an effective width of approximately 0.5 mm.

8. An optical imaging system for transmitting reflected line images from a scan strip on a platen along an optical path extending through a linear lens array into the surface of a photosensitive imaging medium, the improvement wherein the scanning strip is formed as a mask applied to the platen surface, said mask comprising two opaque portions with a transparent scanning slit therebetween, said slit having a width approximately 0.5 mm.

9. A method for forming anamorphically reduced or enlarged images of a document moving across an object platen at a scanning speed and onto a photosensitive member moving through an imaging zone at a process speed and including the steps of:

illuminating the moving document with a narrow band of illumination, projecting the light reflected from the document through a gradient index lens array onto the surface of said photosensitive member, varying the ratio of the scanning speed to the process speed to achieve a particular magnification of the image at the image photosensitive member surface, and selectively blocking some of the reflected light from an object side of the lens array and some of the light projected from the lens array toward the photosensitive member, the selective blocking creating an effective imaging aperture having a width approximately 0.5 mm.

* * * * *